United States Patent
Hoover et al.

(12)
(10) Patent No.: US 6,410,630 B1
(45) Date of Patent: Jun. 25, 2002

(54) HIGH SOLIDS FLUOROELASTOMER COMPOSITIONS

(75) Inventors: Gary Scott Hoover, Mount Laurel, NJ (US); Edwin William Ross, Jr., Gladwyne, PA (US)

(73) Assignee: Pelseal Technologies, LLC, Newton, PA (US)

( * ) Notice: Subject to any disclaimer, the term of this patent is extended or adjusted under 35 U.S.C. 154(b) by 0 days.

(21) Appl. No.: 09/474,314

(22) Filed: Dec. 29, 1999

(51) Int. Cl.$^7$ .............................. C08K 5/07; C08K 3/10
(52) U.S. Cl. ...................... 524/365; 524/413; 524/423; 524/425; 524/448; 524/449; 524/450; 524/496; 524/544; 524/545; 524/546
(58) Field of Search .................. 524/413, 423, 524/425, 448, 449, 450, 496, 544, 545, 546, 365

(56) References Cited

U.S. PATENT DOCUMENTS

| | | | |
|---|---|---|---|
| 3,906,746 A | 9/1975 | Haines | 64/17 A |
| 4,032,699 A | 6/1977 | West, III | 526/18 |
| 4,143,204 A | 3/1979 | Fang | 428/413 |
| 4,185,841 A | 1/1980 | Brundage | 277/167.5 |
| 4,260,509 A | 4/1981 | Douda et al. | 252/171 |
| 4,323,603 A | 4/1982 | Close | 252/342 |
| 4,423,183 A | 12/1983 | Close | 524/546 |
| 4,447,478 A | 5/1984 | Close | 524/413 |
| 4,506,054 A | 3/1985 | Vasta | 427/407.1 |
| 4,647,157 A | 3/1987 | Chiklis | 258/243 |
| 4,696,989 A | 9/1987 | Oka et al. | 526/254 |
| 4,711,474 A | 12/1987 | Patrick | 285/332 |
| 4,985,520 A | 1/1991 | Hayashi et al. | 526/254 |
| 5,093,427 A | 3/1992 | Barber | 526/276 |
| 5,206,293 A * | 4/1993 | Sakai et al. | 525/194 |
| 5,275,887 A | 1/1994 | Johnson et al. | 428/422 |
| 5,384,345 A * | 1/1995 | Naton | 523/218 |
| 5,739,233 A | 4/1998 | Sokolov et al. | 526/245 |
| 5,824,416 A | 10/1998 | Chen et al. | 428/421 |
| 5,824,755 A * | 10/1998 | Hayahi et al. | 526/206 |
| 5,858,540 A | 1/1999 | Hayami et al. | 428/421 |
| 5,874,506 A | 2/1999 | Tatsu et al. | 525/340 |

FOREIGN PATENT DOCUMENTS

GB 871582 * 6/1961

OTHER PUBLICATIONS

"Fluorodyn Caulk Advertisement", 1999, Thermodyn Corporation, 3550 Silica Road, Sylvania, Ohio, 43560.

J.M. Bowman, "Solution Coatings of Viton", Viton Bulletin No. 16, pp. 2–10 (1996).

* cited by examiner

Primary Examiner—Peter D. Mulcahy
(74) Attorney, Agent, or Firm—Ratner & Prestia

(57) ABSTRACT

A high solids content composition containing a fluoroelastomer, a solvent, and a low solvent absorptine filler is workable to fill voids, coat, adhere, seal, and protect various substrates from chemical permeation, corrosion, abrasion, etc. in horizontal or vertical applications. The fluoroelastomer component comprises copolymers of hexafluoropropylene and vinylidene flouride and/or terpolymers of hexafluoropropylene, vinylidene fluoride, and tetrafluoroethylene. The solids content of the composition is at least about 75%. The composition may include a curing agent to solidify the composition.

36 Claims, No Drawings

HIGH SOLIDS FLUOROELASTOMER COMPOSITIONS

TECHNICAL FIELD

The present invention relates generally to fluoroelastomer compositions and, more particularly, to a high solids content, solvated, fluoroelastomer composition which is workable and is useful for both horizontal and vertical applications.

BACKGROUND OF THE INVENTION

High solids content, solvated, fluoroelastomer compositions are typically used to fill voids, coat, adhere, seal, and protect various substrates from chemical permeation, corrosion, abrasion, etc. Similar low solids content compositions are used as coatings to protect the surface of different substrates. The properties of the sealants, caulks, adhesives, and coatings are commonly adjusted for structural stability and to impart resistance to chemicals, pressure, abrasion, and temperature.

Such compositions often comprise fluoroelastomers which commonly consist of polymers of hexafluoropropylene (HFP), vinylidene fluoride ($VF_2$), and tetrafluoroethylene (TFE). These fluoroelastomer polymers can be cured by a variety of curing agents, for example, amines, bisphenols, and peroxides. Metallic oxides are commonly used to react with HF generated during the curing reaction. In addition, ketones, such as methyl ethyl ketone, and acetates are common solvents used with these fluoroelastomers. One well-known commercial product line comprised of such fluoroelastomers is that referred to as VITON® fluoroelastomers (a product of DuPont Dow Elastomers L.L.C.). VITON® fluoroelastomers are comprised of HFP, $VF_2$, and TFE. Another well-known commercial fluoroelastomer, named Fluorel™/Dyneon™ (a product of Dyneon of Oakdale, Minn.), incorporates similar compounds, such as HFP, $VF_2$, and TFE. Such fluoroelastomer compositions have been used often in molded seal products (sealants), less commonly in coatings, and even less commonly in caulks.

Low molecular weight copolymers of $VF_2$ and HFP display high heat and chemical resistance and can be used as components of seals, wire coatings, and diaphragms in equipment which are exposed to high temperatures and corrosive liquids and gases.

Known high solids content, solvated, fluoroelastomer compositions generally have a solids content of less than 75%. With higher levels of solids, these compositions are not easily manipulable and are unworkable. Such compositions are also prone to cracking, blistering, and bubbling caused by air trapped in the compositions. Lower solids content compositions also typically encounter shrinkage problems when they dry, thus requiring multiple passes. Because of the additional time and expense necessary in using lower solids content compositions, they are less useful.

SUMMARY OF THE INVENTION

The present invention comprises a high solids (at least 75% by weight) content fluoroelastomer composition containing HFP, $VF_2$, and/or TFE fluoroelastomers of which at least 40% by weight is vinylidene fluoride. The composition further comprises a solvent, typically an acetate or ketone, and a low solvent absorptive filler (LSA filler). Optionally, the composition may comprise additional additives to effect various properties of the composition, including other fillers. The LSA filler is one which has a combination of properties, such as surface area, particle size, and oil absorption, that, when incorporated into the composition of the present invention, yields a workable, solvated, fluoroelastomer composition.

The composition of the present invention can be used for both horizontal and vertical applications depending on the type and amount of filler and other additives used. Further, in certain embodiments of the invention, the composition includes a low-temperature curing agent containing polyfunctional amines, amino silanes, and ketimines.

Generally, the average Mooney Viscosity of the fluoroelastomer used in the present invention, when measured at 250° F., is less than about 60. Mooney Viscosity is calculated as ML 1+10@250° F. where "ML" represents the minimum torque value for a Mooney Viscometer and the numerical values following "ML" represent the amount of time it takes for the sample to heat up (1 minute) and the amount of time the machine runs at temperature (10 minutes), respectively.

The composition may also comprise a thixotropic agent which regulates the shear thinning index of the composition.

It is to be understood that both the foregoing general description and the following detailed description are exemplary, but are not restrictive, of the invention.

DETAILED DESCRIPTION OF THE INVENTION

The present invention comprises a high solids content, solvated, fluoroelastomer composition which is workable and usable in both vertical and horizontal sealing applications to fill voids, coat, adhere, seal, and protect various substrates from chemical permeation, corrosion, abrasion, etc. After placement, the composition hardens to form a seal at the filling site. The hardening may be caused by solvent evaporation, chemical cross-linking of the polymer, or a combination of the two effects. The term "workable" means that it is possible to stir, pour, and apply the product to a wide variety of surfaces without difficulty. For vertical applications, it is important, however, that the flowability of the composition be sufficiently low to prevent spontaneous flow after placement.

The fluoroelastomer component contains hexafluoropropylene (HFP), vinylidene fluoride ($VF_2$), tetrafluoroethylene (TFE), and/or any other fluoroelastomer having suitable properties for incorporation into a high solids composition. Specifically, copolymers of HFP and $VF_2$ or terpolymers of HFP, $VF_2$, and TFE generally form the fluoroelastomer component of the composition, of which preferably at least 40% (more preferably 60%) by weight is vinylidene fluoride. The average Mooney Viscosity (ML 1+10@250° F.) of these compounds should be less than about 60, preferably less than about 40, more preferably less than about 10.

Generally, such fluoroelastomers, as are useful in the present invention, will have an average molecular weight at or below 100,000 Daltons.

Fluoroelastomer solutions with lower solution viscosities (usually attributable to a low molecular weight and low compound viscosity of the fluoroelastomers) are prepared so that the compositions of the present invention can be fluid at the desired higher solids content formulations. Table 1 shows the compound and solution viscosities of four fluoroelastomers commonly used in the composition of the present invention, namely Dyneon™ FC 2210X, VITON® A-100, Dyneon™ FC 2211, and VITON® A. Each of these fluoroelastomers is a copolymer of HFP and $VF_2$. The compositions are tested for solution viscosity at a 65% solids content in methyl ethyl ketone (MEK) and no filler is included. Fillers would enable compositions of a higher solids content, such as in the present invention.

TABLE 1

| Fluoroelastomer Polymer | Mooney Viscosity (ML 1 + 10 @ 250° F.) | Solution Viscosity (centipoises (cps)) 65% solid in MEK |
|---|---|---|
| Dyneon ™ FC 2210X | <1 | 160 |
| VITON ® A-100 | 12 | 45,000 |
| Dyneon ™ FC 2211 | 14 | 90,000 |
| VITON ® A | 40 | >2,000,000 |

The solids content of the composition of the present invention is at least about 75%, by weight, preferably from about 80% to about 95%, more preferably from about 80% to about 90%. Solids contents above 95% may also be usable, so long as the molecular weight and the solution viscosity of the fluoroelastomer, the filler content, and other variables are adjusted to maintain the workability of the composition. The high solids content in the composition allows for a reduction in the amount of undesirable volatile organic compounds (VOC's) produced.

The composition further comprises a solvent component and a filler component. The solvent component may include ketones or acetates, or compounds having similar chemical moieties. The solvent component may include at least one high boiling point solvent, i.e., having a boiling point of at least about 100° C., preferably between about 100° C. and 200° C. High boiling point solvents reduce air trapped in the composition, thereby reducing voids in the composition. They provide better surface quality than solvents with low boiling points. However, use of high boiling point solvents increases the solution viscosity and the drying time of the composition. Examples of such high boiling point solvents are methyl isobutyl ketone, butyl acetate, and butyl cellosolve.

In addition, the solvent component may include a volatile, oxygen-containing, low boiling point solvent, i.e., having a boiling point between about 50° C. and 90° C. The low boiling point solvents aggressively solvate the compounds of the composition and dry very quickly. However, they are volatile and can cause air entrapment in the composition. Examples of such low boiling point solvents are methyl ethyl ketone and ethyl acetate. Typically, the solvent component comprises from about 25% to about 75% of a low boiling point solvent and from about 25% to about 75% of a high boiling point solvent.

Choosing the appropriate filler as the LSA filler is critical to achieving the low solution viscosities at high solids content required by the present invention. Low solution viscosities for the composition are desirable because it is possible to solvate compositions with low solution viscosities at the desired higher solids levels without increasing solution viscosity to levels that make it difficult to apply the composition. Properties which are important in choosing an appropriate filler include the surface area, particle size, and oil absorption of the filler.

Fillers with large particle sizes will have lower surface areas and tend to absorb less solvent. This type of filler will tend to have lower oil absorption values and create solutions with low viscosities at high solids levels. Variations in particle shape, density, surface activity, etc. will cause variations in these trends, but generally, grades of fillers with larger particles and lower surface areas will be preferable to grades of the same filler with smaller particles and higher surface areas (see Table 3 below). A filler is considered an LSA filler if, when it is incorporated into a fluoroelastomer composition produced by combining 115 grams of filler with 115 grams of VITON® A fluoroelastomer and combining 112 grams of methyl ethyl ketone (MEK) with 208 grams of the fluoroelastomer/filler mixture (the resulting composition has a solids content of 65%), the fluoroelastomer composition has a solution viscosity of no more than 50,000 centipoises (cps) at 25° C. (A 65% solids content was used instead of a solids content at or above 75% because the relative effect of different fillers on solution viscosity is more easily measured at 65% solids).

Various types of fillers that have been found to be useful as LSA fillers provided the surface area of that candidate filler is below the maximum surface area allowed for that filler type. These are listed below.

| Filler Type | Maximum Surface Area (m$^2$/g) |
|---|---|
| Barium Sulfate | 5 |
| Nepheline Syenite | 5 |
| Silica | 5 |
| Sodium Aluminum Silicate | 5 |
| Carbon Black | 30 |
| Zirconium Silicate | 15 |
| Calcium Sulfate | ~10 |
| Mica | 5 |
| Calcium Carbonate | 5 |
| Diatomite | 5 |
| Titanium Dioxide | 15 |
| Aluminum Silicate | 50 |
| Calcium Metasilicate | 5 |
| Alumina Tryhydrate | 10 |

Note that an Aluminum Silicate filler, having the trade name Burgess 2211 (listed in Table 3), has a surface area below 50m$^2$/g (i.e., 10) which would normally qualify it as an LSA filler. Nevertheless, Burgess 2211 is surface treated by the manufacturer and, as a result, does not have the low solvent absorptive property and is not a usable LSA filler.

In addition to choosing the correct type and grade for the LSA filler, which may comprise one or more fillers (such as from the above list), it is also important to choose the correct amount of such LSA filler. Typically, the weight of the LSA filler component can be up to about 3.5 times the weight of the fluoroelastomer component. Preferably, the weight of the LSA filler is from about 0.5 to about 3.0 times the weight of the fluoroelastomer component, more preferably from about 1.5 to about 2.5 times the weight of the fluoroelastomer component.

Table 2 shows the effect of increasing the amount of a specific LSA filler, nepheline syenite, commercially available as Minex 4 (see Table 3 for characteristics), on the solution viscosity of fluoroelastomer compositions. Specifically, by adding an LSA filler or increasing the amount of an LSA filler (e.g., nepheline syenite Minex 4), the solution viscosity decreases. The filler amounts are expressed as "phr" or "parts filler per hundred parts rubber." For example, 100 phr filler would represent an equal amount of filler and fluoroelastomer polymer. For this experiment, the fluoroelastomer used was VITON® A. The resulting mixture of fluoroelastomers and filler was solvated to a level of 65% solids in MEK (A 65% solids content was used instead of a solids content at or above 75% because the relative effect of different fillers on solution viscosity is more easily measured at 65% solids. The same relative effect of different fillers on solution viscosity, as displayed in Table 2, would occur when testing a composition having a solids content at or above 75%.).

TABLE 2

| Filler Amount/Phr (nepheline syenite) | Solution Viscosity (cps) |
|---|---|
| 0 | >2,000,000 |
| 50 | 58,000 |
| 100 | 8,500 |
| 150 | 4,000 |
| 200 | 3,400 |
| 250 | 2,500 |

Table 3 shows the surface area, particle size, and oil absorption of various fillers and describes and lists the trade name of each filler. In addition, Table 3 shows the resulting solution viscosity when these fillers are incorporated into a composition produced by combining 115 grams of each listed filler with 115 grams of VITON® A fluoroelastomer, and combining 112 grams of MEK with 208 grams of the fluoroelastomer/filler mixture. The resulting composition has a solids content of 65% (A 65% solids content was used instead of a solids content at or above 75% because the relative effect of different fillers on solution viscosity is more easily measured at 65% solids. The same relative effect of different fillers on solution viscosity, as displayed in Table 3, would occur when testing a composition having a solids content at or above 75% .).

For horizontal applications, a composition which will flow, level itself, and form a product substantially free of voids caused by air trapped during application is desirable. Its solution viscosity should be from about 5,000 to about 500,000 centipoises, preferably from about 10,000 to about 100,000 centipoises. The low range of viscosities obtained from the fillers in Table 3, such as from about 8,500 to about 50,000 cps, are preferred for horizontal applications.

Table 3 demonstrates the overall relationship between the solution viscosity of a 65% solids fluoroelastomer composition and the properties of a filler incorporated therein. That is, as the surface area and oil absorption of the filler decrease and the particle size of the filler increases, the solution viscosity of the composition generally decreases and the preferred lower solution viscosity values are obtained.

TABLE 3

| Filler Description | Trade Name | Surface Area (m2/g) | Particle Size (microns) | Oil Absorption (g/100 g) | Solution Viscosity (cps) |
|---|---|---|---|---|---|
| Barium Sulfate (from Supplier Taber Inc. of Barrington, RI) | Blanc Fixe 136F | 3 | 1 | 15 | 8,500 |
| Nepheline Syenite (from Unimin Specialty Minerals, Inc. of Elco, IL) | Minex 4 | 2 | 6.8 | 26 | 8,500 |
| Silica (from Unimin Specialty Minerals, Inc. of Elco, IL) | Imsil A-75 | 1.3 | 12 | 27 | 10,000 |
| Nepheline Syenite (from Unimin Specialty Minerals, Inc. of Elco, IL) | Minex 2 | 1.0 | 14.3 | 23 | 10,750 |
| Sodium Aluminum Silicate (from K-T Feldspar Corp. of Spruce Pine, NC) | Minspar 4 | 1.1 | 8 | 25 | 13,000 |
| Carbon Black (from Engineered Carbons, Inc. of Borger, TX) | N-990 | 8 | 0.4 | 36 | 13,000 |
| Sodium Aluminum Silicate (from K-T Feldspar Corp. of Spruce Pine, NC) | Minspar 3 | 1 | 12 | 22 | 13,125 |
| Zirconium Silicate (from Johnson Mathey Ceramics, Inc. of Niagara Falls, NY) | Superpax A | 11 | 1 | Not Available (N/A) | 17,500 |
| Calcium Sulfate (from U.S. Gypsum Company Chicago, IL) | Snow White | ~2–3 | 7 | 26 | 19,000 |
| Mica (from Franklin Industrial Minerals of Kings Mountain, NC) | Mica L-135 | 1.2 | N/A | 260 | 19,500 |
| Calcium Carbonate (from OMYA, Inc. of Procor, VT) | Omyacarb 3 | 3.2 | 3.2 | 11 | 20,500 |
| Diatomite (from World Minerals of Lompoc, CA) | Celite 350 | 2 | 9 | 120 | 21,000 |
| Diatomite (from World Minerals of Lompoc, CA) | Celite Superfloss | 2 | 9 | 120 | 21,000 |
| Titanium Dioxide (from Kemira, Inc. of Savannah, GA) | Kemira 220 | 10 | 0.2 | 27 | 22,500 |
| Mica (from Franklin Industrial Minerals of Kings Mountain, NC) | Mica L-140 | 2.4 | N/A | 70 | 22,500 |
| Aluminum Silicate, Treated (from Engelhard Corp. of Iselin, NJ) | Translink 37 Clay | 9 | 1.4 | 50 | 23,500 |
| Calcium Metasilicate (from NYCO Minerals, Inc. of Willsboro, NY) | Nyad 325 | 2 | 10 | 20 | 25,500 |

TABLE 3-continued

| Filler Description | Trade Name | Surface Area (m2/g) | Particle Size (microns) | Oil Absorption (g/100 g) | Solution Viscosity (cps) |
|---|---|---|---|---|---|
| Aluminum Silicate (from H. M. Royal, Inc. of Trenton, NJ) | Royal King Clay | 24 | 0.3 | 35 | 30,000 |
| Calcium Metasilicate (from NYCO Minerals, Inc. of Willsboro, NY) | Nyad 400 | 2 | 8.5 | 22 | 31,500 |
| Alumina Trihydrate (from J. M. Huber Corp. of Atlanta, GA) | Micral 632 | 7 | 3.5 | 32 | 37,500 |
| Titanium Dioxide (from Kemira, Inc. of Savannah, GA) | Kemira 460 | 10 | 0.2 | 16 | 37,500 |
| Carbon Black (from Engineered Carbon Blacks, Inc. of Borger, TX) | N-762 | 28 | 0.08 | 65 | 50,000 |
| Silica (from U.S. Silica Co. of Berkeley Springs, WV) | Min-U-Sil 5 | 5.5 | 2 | 35 | >2,000,000 |
| Magnesium Carbonite (from Morton International of Danvers, MA) | Elastocarb BMC | 25 | N/A | N/A | >2,000,000 |
| Silica (from P.P.G. Industries, Inc. Pittsburgh, PA) | Hi-Sil 233 | 150 | 0.02 | 190 | >2,000,000 |
| Calcium Carbonate (from Whittaker, Clark & Daniels of Norcross, GA) | Calcium Carbonate XLT 2924 | 8.5 | 1.8 | NA | >2,000,000 |
| Aluminum Silicate (J. M. Huber Corp., of Norcross, GA) | Zeolex 23 | 75 | 6 | 120 | >2,000,000 |
| Magnesium Silicate (from Luzenac America of Englewood, CO) | Mistron CB | 16 | 2.3 | 40 | >2,000,000 |
| Silica (from Harwick Standard Dist. Corp. of Akron, OH) | Silene 732D | 35 | N/A | 145 | >2,000,000 |
| Aluminum Silicate, Treated (from Burgess Pigment Co. of Sandersville, GA) | Burgess 2211 | 10 | 1.3 | 62 | >2,000,000 |
| Carbon Black (from Engineered Carbon Blacks, Inc. of Borger, TX) | N-550 | 41 | 0.04 | 120 | >2,000,000 |
| Magnesium Silicate (from Luzenac America of Englewood, CO) | Mistron Vapor | 13.4 | 2.2 | 43 | >2,000,000 |

Some of the fillers listed in Table 3, for example, Hi-Sil 233 and Carbon Black N-550, do not qualify as LSA fillers useful by themselves as the required fillers for the compositions of the present invention, but may, in combination with other fillers, which do so qualify, be used to increase the solution viscosity of compositions within the scope of the present invention.

This invention can be used with or without chemical cross-linking agents. If cross-linking agents are desired to increase the strength of the hardened composition, they can be chosen from the amines, peroxides, and bisphenols currently used to cure more commonly produced fluoroelastomers. These cross-linking agents are typically added in amounts from about 0.5% to about 5.0% by weight of the fluoroelastomer component.

Polyfunctional amine curatives (such as methylene diamine, triethylenetetramine, hexamethylene diamine, and other amines with similar functional moieties) offer low temperature cures that are desirable for many applications. These curatives must generally be added immediately prior to application (as a two-part system) to prevent premature curing. Ketimines (which react with moisture to create amines) provide longer pot lives than amines. Amino silanes (such as gamma-aminopropyltriethoxysilane, N-beta-aminoethyl-gamma-aminopropyltrimethoxysilane, and other amino silanes with similar functional moieties) can be effective cross-linking agents and they can also improve adhesion to many substrates.

Bisphenol curatives (such as 2,2-bis(4-hydroxyphenyl) hexafluoropropene) can be incorporated prior to solvation for simple, one-part systems, however, they generally require heat to activate cross-linking. These curatives are often accelerated with a quaternary phosphonium salt, such as triphenylbenzyl phosphonium chloride.

Peroxide curatives (such as 2,5-dimethyl,2,5-di(t-butyl-peroxy) hexane) can also be incorporated into one part systems, but also require heat to activate cross-linking. These curatives are typically used in combination with a co-agent such as triallyl isocyanurate. Peroxides can only be used in combination with polymers that have bromine-modified bond sites.

Optionally, compounds, such as metal oxides, that accelerate curing and increase the cross-link density in the fluoroelastomer polymer by acting as acid acceptors, may be incorporated into the fluoroelastomer composition. The compounds may be incorporated into the composition in a proportion of from about 5% to about 30% by weight of the fluoroelastomer component. Preferred metal oxides for use in the compositions of this invention include magnesium oxide, zinc oxide, lead oxide, and calcium hydroxide.

Further, compositions of the present invention may also include certain other types of additives, such as Theological additives (a thixotropic agent, for example, which provides for non-Newtonian (pseudoplastic) flow), lubricious processing aids, and silicone additives. Examples of such Theological additives include polytetrafluoroethylene (PTFE); aramid fibers; and certain fillers, such as clays, high surface area silicas, high surface area carbon blacks, polyethylene, and other high surface area fillers. For purposes of the present invention, high surface area fillers have a surface area greater than about 50 m²/g. Products produced entirely with the above listed fillers as the only filler would be impossible to work. However, when one of these fillers is present in quantities of about 5–50% of the polymer weight and is added to a composition which also contains an LSA filler (such as those discussed with reference to Table 3), the composition would have desirable flow characteristics for use as a coating, adhesive, sealant, or caulk.

The rheological additives may comprise up to 100% by weight of the fluoroelastomer component in the composition of the present invention. Typical ranges for such additives are 1–4% for aramid fibers and 1–15% for PTFE.

The lubricious processing aids that may be incorporated into the composition of this invention are primarily organic and contain fatty acids; these may comprise waxes, such as carnuba and commercial products such as DuPont Dow Elastomers L.L.C.'s VITON® Processing Aids (VPA) No. 1, VPA No. 2, Dyneon's (A 3M Hoechst Enterprise) Dynamar PPA-79, and a fatty oily organic compound (such as TE-88XL paste, a product of Technical Processing of Paterson, N.J.); stearates, such as zinc stearate, potassium stearate, and stearic acid; or oils, which may be incorporated to prevent sticking of the composition to machinery at high temperatures. The processing aid may comprise up to about 10% of the weight of the fluoroelastomer component, preferably about 6%.

The compositions of this invention may also include silicone additives, which reduce the surface tension of the compositions. Low surface tension lessens or minimizes undesirable bubbling in the composition. These silicone additives are typically silicone elastomers or silicone oils, with a low surface tension. A preferred silicone additive is the silicone elastomer GP-30 (a product of Dow Corning). The silicone additive may comprise up to about 10% of the weight of the fluoroelastomer component, but a silicone additive content of about 1% is preferred.

Pigments, such as DISCO 500 (listed in Table 5), carbon blacks, and titanium dioxide, may be added to the composition in order to alter its color. Any suitable pigment compatible with fluoroelastomer compositions may be used.

For vertical applications, a composition of the present invention should have limited or no flow. Such a composition should maintain its shape when placed on a surface, and yet be stirable without requiring significant effort. These properties of the composition can be obtained by use of thixotropic agents, such as polyethylene or aramid fibers, as discussed above, which decrease susceptibility of the composition to flow.

When intended for vertical use, compositions of the present invention should have a shear thinning index greater than about 1.0 and a solution viscosity of about 750,000 to about 6,000,000 centipoises (preferably from about 1,000,000 to about 3,000,000 centipoises with a shear index of at least 1.5). Alternatively, with a lower shear index (about 1), a solution viscosity of about 1,000,000 to about 4,000,000 centipoises is preferred. The shear thinning index (also referred to as "thixotropic index") is the ratio of the solution viscosity measured at a low speed to the solution viscosity measured at a speed 10 times higher. For example, a composition that has a solution viscosity of 1,500,000 centipoises at 2 RPM and a solution viscosity of 1,000,000 centipoises at 20 RPM would have a shear thinning index of 1.5.

One method of preparing compositions for vertical use comprises modifying the high solids content compositions used for horizontal applications by increasing their solution viscosity. This can be accomplished by increasing the solids content of the composition and/or adding an agent, such as a thixotropic agent, that increases the shear thinning index of the composition to at least about 1.0. These thixotropic agents include inert fibers and other polymers that prevent liquid from flowing freely, such as aramid fibers (Kevlar), PTFE, polyethylene, and polymer microspheres, and fillers, such as high surface area silicas, high surface area calcium carbonate, clays (e.g., aluminum silicate), and high surface area carbon blacks. Further examples of such thixotropic agents are those fillers listed in Table 3 which, when incorporated into the exemplary fluoroelastomer composition on which the data of Table 3 is based, yield a solution viscosity of greater than 2,000,000 cps (i.e., the fillers listed in Table 3 which do not qualify as LSA fillers).

Thixotropic agents provide a structure that resists flow when not contacted by a shearing force, but which is easily displaced by a high shearing force. The particle shape and the particle interaction of particulate materials (e.g., clays) which are "platy" (flaky), are particularly desirable for increasing the shear thinning index of the composition. In fact, particles of such thixotropic agents can flocculate to create strings of particles acting similarly to aramid fibers.

EXAMPLES

Tables 4 and 5 show the components of exemplary compositions.

TABLE 4

| Component | Ingredient | % of Total Composition |
| --- | --- | --- |
| Fluoroelastomer | VITON ® A-100 | 36.36 |
| Filler | Nepheline Syenite (Minex 4) | 43.64 |
| Solvent | MEK (methyl ethyl ketone) solvent | 20 |

The VITON® A-100 fluoroelastomer of this exemplary composition has a Mooney Viscosity (ML 1+10@250° F.) of approximately 12. In addition, the amount of nepheline syenite (Minex 4) (120 phr) is higher than that heretofore used in fluoroelastomer compositions. The solids content of the composition is about 80% and its solution viscosity is about 95,000 cps. The composition does not require any curing agent and, when poured directly into a joint, will dry to form a solid, flexible, chemically inert material that will prevent permeation by a variety of chemicals that would damage most common non-fluoroelastomer adhesives, sealants, coatings, caulks, etc.

Additional exemplary compositions of the present invention are listed with the relative amounts (in parts per 100 parts of the fluoroelastomer) of their components in Table 5. Compositions A, C–F, and H would be used in horizontal applications, while Compositions B, G, and I would be used in vertical applications. Note, Composition C is identical to the composition of Table 4. The fillers used in these compositions are barium sulfate, nepheline syenite (Minex 4), nepheline syenite (Minex 2), titanium dioxide, silica, and carbon black N-990 (titanium dioxide and carbon black N-990 also function as pigments). In Compositions A and C–H, these fillers yield a composition having a solution viscosity at or below 500,000 cps. (Compositions B and I have a higher solution viscosity.)

TABLE 5

| Ingredient | A | B | C | D | E | F | G |
|---|---|---|---|---|---|---|---|
| VITON ® GBL-205 LF (Mooney Viscosity = 20) | | | | | | 60 | 60 |
| Dyneon ™ 2211 | 60 | 60 | | | | | |
| Dyneon ™ FC-2210X | 40 | 40 | | 100 | 100 | 40 | 40 |
| VITON ® A-100 | | | 100 | | | | |
| Barium Sulfate (Blanc Fixe 136F) | 220 | 220 | | | | | |
| Nepheline Syenite (Minex 4) | | | 120 | 175 | 200 | | |
| Nepheiine Syenite (Minex 2) | | | | | | 175 | 175 |
| Titanium Dioxide (Kemira 220) | 3 | 3 | | | | | |
| Silica (Hi-Sil 233) | | | | | | | 25 |
| Carbon Black (N-990) | 4 | 4 | | | 6 | 15 | 15 |
| DISCO 500 Red Pigment (from Diso, Inc. of Ringwood, NJ) | | | | 10 | | | |
| Magnesium Oxide (Maglite Y) (from C.P. Hall, Inc. of Chicago, IL) | 15 | 15 | | 15 | 15 | | |
| Zinc Oxide (AZO 66 TT) | | | | | | 3 | 3 |
| TE-88 XL Paste (Organic Lubricant) | 6 | 6 | | 4 | 6 | | |
| Polyethylene (A-C 617 of Allied Signal, Inc. of Morristown, NJ) | | 30 | | | | | |
| Silicone (Silastic GP-30 of Dow Corning STI of Plymouth, MI) | 1 | 1 | | 1 | 1 | | |
| 2,5-Dimethyl-2,5-di(t-butyl-peroxy)hexane (Varox DBPH) | | | | | | 2 | 2 |
| Triallylisocyanurate (DIAK 7) | | | | | | 2 | 2 |
| Gamma Aminopropyltriethoxysilance (Silquest A-1100 of OSi Specialties of Friendly, WV) | 1.7 | 1.6 | | 1.4 | 1.5 | | |
| Methyl Isobutyl Ketone Ketimine (Epicure 3502 of Shell Chemical) | 1.7 | 1.6 | | 1.4 | 1.5 | | |
| % Solids | 83 | 85 | 80 | 90 | 85 | 90 | 80 |
| % and Type of Solvent(s) | 9% methyl isobutyl ketone (MIBK) 8% acetone | 5% MIBK 10% acetone | 20% MEK | 5% MIBK 5% acetone | 5% Isobutyl Heptyl Ketone | 5% Isobutyl Heptyl Ketone 5% acetone | 4.4% Isobutyl Heptyl Ketone 15.6% acetone |
| Solution Viscosity (cps) | 50,000 | 1,500,000 at 2 RPM; 1,000,000 at 4 RPM | 100,000 | 50,000 | 35,000 | 300,000 | 500,000 at 2 RPM; 370,000 at 4 RPM; 260,000 at 10 RPM; 190,000 at 20 RPM |

| Ingredient | H | I |
|---|---|---|
| Dyneon ™ FC-2211 | 81 | 81 |
| Dyneon ™ FC-2210X | 19 | 19 |
| Nepheline Syenite (Minex 4) | 154 | 154 |
| Carbon Black N-990 | 6 | 6 |
| Hi-Sil 233 | | 20 |
| Magnesium Oxide (Maglite Y) | 10 | 10 |
| Gamma Aminopropyltriethoxysilane | 1 | 1 |
| Methyl Isobutyl Ketone Ketimine | 1 | 1 |
| % and Type of Solvent | 20% MIBK | 20% MIBK |
| Solution Viscosity (cps) | 130,000 | >2,000,000 |

COMPARATIVE EXAMPLES

Table 6 displays the properties of four additional fluoroelastomer compositions ($A_1$–$D_1$) incorporating various components. Because these compositions do not contain the LSA fillers in appropriate amounts, contain an improper fluoroelastomer for the present invention, or both, none of these compositions, with the possible exception of Composition $D_1$, would be as workable as the compositions of the present invention described above, and as listed in Table 5. As shown, usable to compositions from these examples are only obtained at solids contents below that of the present invention. When the compositions of Table 6 have solids contents at or above 75%, they become very difficult to stir and apply. The ingredients are listed as parts per hundred parts of fluoroelastomer.

TABLE 6

|  | $A_1$ | $B_1$ | $C_1$ | $D_1$ (Marginal) |
|---|---|---|---|---|
| VITON ® B (ML 1 + 10 @ 250° F. = 75) | 100 | 100 | 100 |  |
| VITON ® A (ML 1 + 10 @ 250° F. = 40) |  |  |  | 100 |
| N-762 Carbon Black | 40 |  |  |  |
| Barium Sulfate (Blanc 136 F) |  | 40 | 100 | 100 |
| Magnesium Oxide (Maglite Y) | 10 | 10 | 10 | 10 |
| Solution Viscosity (cps) 50% solids solution in MEK | 500,000 | 280,000 | 40,000 | 2,700 |
| Solution Viscosity (cps) 70% solids solution in MEK | >2,000,000 | >2,000,000 | >2,000,000 | 1,000,000 |
| Solution Viscosity (cps) 80% solids solution in MEK | >2,000,000 | >2,000,000 | >2,000,000 | >2,000,000 |

Composition $A_1$, exhibits the features of an excellent fluoroelastomer coating if solvated at only 20–30% solids. At 50% solids, it has a solution viscosity of 500,000 cps and has the flow characteristics of a good, high solids product, however, the solid density is higher than the solvent density. This creates a product that will shrink to approximately 31% of its original volume.

If filling a 1 inch deep joint with such a material, the first, flush pass only fills 0.31 inches after the coating dries and shrinks. The second pass fills 31% of the remaining 0.69 inches bringing the level to 0.52 inches. It takes three flush passes just to fill the joint to the 0.67 inch point because of the shrinkage of the coating in each pass. If the same A, composition is solvated at 80% solids, it has a shrinkage of 64% of its original volume and fills the joint nearly as completely with one pass as the 50% solids product after 3 passes. At 90% solids, it shrinks to 80% of its original volume, filling the joint much more efficiently in one pass. Even though the shrinkage problems are reduced, at 80% or 90% solids content, Composition $A_1$ is unworkable.

Composition $B_1$ illustrates an improvement in characteristics over Composition $A_1$. By replacing the carbon black N-762 filler with a barium sulfate (Blanc Fixe 136F) filler, the solution viscosity of the 50% solids solution is lowered. The 70% and 80% solids variations of Composition $B_1$ still have viscosities greater than 2,000,000 cps and are too viscous to use, but they are an improvement over Composition $A_1$.

A similar improvement is seen in Composition $C_1$ when the amount of filler is increased from 40 parts to 100 parts per 100 parts of the fluoroelastomer component. This product is still too viscous even at 70% solids, but it is closer to being an acceptable high solids, workable product than either Compositions $A_1$ or $B_1$.

Composition $D_1$ represents a product that is on the edge of performing as a composition within the scope of the present invention. By replacing the VITON® B fluoroelastomer with a lower solution viscosity VITON® A fluoroelastomer, the solution viscosity of the composition is reduced to the point that it is possible to stir and pour the 70% solids variation. The properties of this product would be superior to any known high solids content, solvated, fluoroelastomer joint products currently produced, but it still does not perform at the levels of the preferred compositions illustrated above. At 80% solids, Composition $D_1$ is not likely to be useful as a practical matter.

While this invention has been described with respect to specific examples and embodiments thereof, it is not limited thereto. The claims which follow are intended to be construed to include all modifications of these examples and embodiments, and to such other forms thereof as may be devised by those skilled in the art without departing from the true spirit and scope of the present invention.

What is claimed:

1. A composition comprising:
    a fluoroelastmeter having a Mooney Viscosity (ML 1+10@250° F.) about 60, selected from the group consisting of copolymers of hexafluoropropylene and vinylidene fluoride and terpolymers of hexafluoropropylene, vinylidene fluoride, and tetrafluoroethylene, and containing at least 40%, by weight, vinylidene fluoride;
    up to 25%, by weight, solvent in which the fluoroelastomer is soluble, said solvent being present in an effective amount to make said composition workable;
    and an LSA filler in the amount of 50 to 250 parts LSA filler per 100 parts of fluoroelastomer, wherein the solids content of the composition is at least about 75%.

2. The composition of claim 1 wherein the composition is workable and solidifies after placement.

3. The composition of claim 2 wherein the filler is selected from the group consisting of barium sulfate having a surface area at or below 5 $m^2/g$, nepheline syenite having a surface area at or below 5 $m^2/g$, calcium carbonate having a surface area at or below 5 $m^2/g$, silica having a surface area at or below 5 $m^2/g$, sodium aluminum silicate having a surface area at or below 5 $m^2/g$, carbon black having a surface area at or below 30 $m^2/g$, zirconium silicate having a surface area at or below 15 $m^2/g$, mica having a surface area at or below 5 $m^2/g$, diatomite having a surface area at or below 5 $m^2/g$, titanium dioxide having a surface area at or below 15 $m^2/g$, calcium metasilicate having a surface area at or below 5 $m^2/g$, alumina tryhydrate having a surface area at or below 10 $m^2/g$, aluminum silicate having a surface area at or below 50 $m^2/g$, and calcium sulfate having a surface area at or below 10 $m^2/g$.

4. The composition of claim 1 wherein the solution viscosity of the composition is less than about 500,000 centipoises.

5. The composition of claim 1 wherein the solution viscosity of the composition is between about 10,000 and about 100,000 centipoises.

6. The composition of claim 1 further comprising a curing agent.

7. The composition of claim 6 wherein the curing agent is selected from the group consisting of polyfunctional amines, amino silanes, and ketimines.

8. The composition of claim 7 wherein the curing agent comprises from about 0.1 to about 5 parts per 100 parts of the composition.

9. The composition of claim 6 further comprising a metal oxide.

10. The composition of claim 9 wherein the metal oxide is selected from the group consisting of lead oxide, magnesium oxide, zinc oxide, and calcium hydroxide.

11. The composition of claim 10 wherein the metal oxide is present in an amount from about 5% to about 30%, by weight, of the fluoroelastomer.

12. The composition of claim 1 further comprising a thixotropic agent, wherein the composition has a shear thinning index of at least about 1.0.

13. The composition of claim 12 wherein the thixotropic agent is selected from the group consisting of polyethylene, tetrafluoroethylene, polytetrafluoroethylene, fluorinated ethylene-propylene, aramid fibers, microspheres, and high surface area fillers.

14. The composition of claim 1 wherein the Mooney Viscosity (ML 1+10@250° F.) of the fluoroelastomer is less than about 40.

15. The composition of claim 14 wherein the Mooney Viscosity (ML 1+10@250° F.) of the fluoroelastomer is less than about 10.

16. The composition of claim 1 wherein the solvent is an oxygen-containing solvent.

17. The composition of claim 16 wherein the oxygen-containing solvent is selected from the group consisting of ketones and acetates.

18. The composition of claim 1 further comprising at least one lubricious processing aid selected from the group consisting of fatty acids, waxes, and stearates.

19. The composition of claim 18 wherein the lubricious processing aid is a fatty oil organic compound, the fatty oil organic compound being present in the amount of 1 to 10 parts per 100 parts of fluoroelastomer.

20. The composition of claim 1 further comprising at least one surface tension-reducing silicone additive.

21. The composition of claim 20 comprising from about 0.5 to about 10 parts silicone per 100 parts of fluoroelastomer.

22. The composition of claim 1 wherein the solids content of the composition is from about 80% to about 95%.

23. A composition comprising:
   35 to 40%, by weight, fluoroelastomer, the fluoroelastomer having a Mooney Viscosity (ML 1+10@250° F.) below about 40 and comprising one or more copolymers of hexafluoropropylene and vinylidene fluoride, the copolymers containing at least 40%, by weight, vinylidene fluoride;
   20%, by weight, methyl ethyl ketone solvent; and
   40 to 45%, by weight, nepheline syenite filler having a surface area at or below 5 $m^2/g$, wherein the solids content of the composition is about 80%.

24. A composition comprising:
   22 to 25%, by weight, fluoroelastomer having a Mooney Viscosity (ML 1+10@250° F.) below about 40, the fluoroelastomer comprising one or more copolymers of hexafluoropropylene and vinylidene fluoride, the copolymers containing at least 40%, by weight, vinylidene fluoride;
   about 15%, by weight, methyl isobutyl ketone and acetone solvent;
   up to about 2%, by weight, fatty oil organic compound;
   up to about 5%, by weight, magnesium oxide;
   up to about 10%, by weight, polyethylene;
   up to about 0.3%, by weight, silicone;
   up to about 0.5%, by weight, gamma aminopropyltriethoxysilane;
   up to about 0.5%, by weight, methyl isobutyl ketone ketimine; and
   49 to 52%, by weight, filler comprising barium sulfate having a surface area at or below 5 $m^2/g$, titanium dioxide having a surface area at or below 15 $m^2/g$, and carbon black having a surface area at or below 30 $m^2/g$, wherein the solids content of the composition is about 85%.

25. A composition comprising:
   28 to 32%, by weight, fluoroelastomer having a Mooney Viscosity (ML 1+10@250° F.) below about 40, the fluoroelastomer comprising one or more copolymers of hexafluoropropylene and vinylidene fluoride, the copolymers containing at least 40%, by weight, vinylidene fluoride;
   about 20%, by weight, methyl isobutyl ketone solvent;
   up to about 5%, by weight, magnesium oxide;
   up to about 0.5%, by weight, gamma aminopropyltriethoxysilane;
   up to about 0.5%, by weight, methyl isobutyl ketone ketimine; and
   45 to 50%, by weight, filler comprising nepheline syenite having a surface area at or below 5 $m^2/g$ and carbon black having a surface area at or below 30 $m^2/g$, wherein the solids content of the composition is about 80%.

26. A composition comprising:
   26 to 29%, by weight, fluoroelastomer having a Mooney Viscosity (ML 1+10@250° F.) below about 40, the fluoroelastomer comprising one or more copolymers of hexafluoropropylene and vinylidene fluoride, the copolymers containing at least 40%, by weight, vinylidene fluoride;
   about 20%, by weight, methyl isobutyl ketone solvent;
   up to about 5%, by weight, magnesium oxide;
   up to about 0.5%, by weight, gamma aminopropyltriethoxysilane;
   up to about 0.5%, by weight, methyl isobutyl ketone ketimine;
   42 to 46%, by weight, filler comprising nepheline syenite having a surface area at or below 5 $m^2/g$ and carbon black having a surface area at or below 30 $m_2/g$; and
   up to about 6%, by weight, thixotropic agent comprising silica having a surface area of about 150 $m^2/g$, wherein the solids content of the composition is about 80%.

27. A composition comprising:
   a fluoroelastomer having a Mooney Viscosity (MF 1+10@250° F.) below about 60, the fluoroelastomer comprising one or more copolymers of hexafluoropropylene and vinylidene fluoride, the copolymers containing at least 40%, by weight, vinylidene fluoride;
   up to 25%, by weight, solvent having at least one member selected from the group consisting of methyl ethyl ketone, acetone, methyl isobutyl ketone, and isobutyl heptyl ketone; and a filler in the amount of 50 to 250 parts filler per 100 parts of fluoroelastomer and selected from the group consisting of barium sulfate having a surface area at or below 5 m$^2$/g, nepheline syenite having a surface area at or below 5 m$^2$/g, calcium carbonate having a surface area at or below 5 m$^2$/g, silica having a surface area at or below 5 m$^2$/g, sodium aluminum silicate having a surface area at or below 5 m$^2$lg, carbon black having a surface area at or below 30 m$^2$/g, zirconium silicate having a surface area at or below 15 m$^2$/g, mica having a surface area at or below 5 m$^2$/g, diatomite having a surface area at or below 5 m$^2$/g, titanium dioxide having a surface area at or below 15 m$^2$/g, calcium metasilicate having a surface area at or below 5 m$^2$/g, alumina tryhydrate having a surface area at or below 10 m$^2$/g, aluminum silicate having a surface area at or below 50 m$^2$/g, and calcium sulfate having a surface area at or below 10 m$^2$/g, wherein the solids content of the composition is from about 80% to about 90%.

28. The composition of claim 27 further comprising a thixotropic agent selected from the group consisting of polyethylene, tetrafluoroethylene, polytetrafluoroethylene, fluorinated ethylene-propylene, aramid fibers, microspheres, and high surface area fillers and wherein the composition has a shear thinning index of at least about 1.0.

29. The composition of claim 27 further comprising at least one member selected from the group consisting of a pigment, a thixotropic agent, a metal oxide, a curing agent, a lubricious processing aid, and a silicone additive.

30. The composition of claim 1 wherein the amounts of the fluoroelastomer, solvent, and LSA filler are effective to (a) form a composition which will flow, level itself, and form a product substantially free of air-caused voids or (b) form a composition having limited or no flow.

31. The composition of claim 1 wherein the amounts of the fluoroelastomer, solvent, and LSA filler is effective to produce (a) a solution viscosity from about 5,000 to about 500,000 CPS or (b) a thixotropic index equal to or greater than about 1 and a solution viscosity from about 750,000 to about 6,000,000 CPS.

32. The composition of claim 1 wherein the fluoroelastomer comprises no cross-linking moiety.

33. The composition of claim 1 wherein the fluoroelastomer comprises a cross-linking moiety in an amount of about 0.5% to about 5.0% by weight of the fluoroelastomer, said moiety derived from a cross-linking agent selected from the group consisting of amines, peroxides and bisphenols.

34. A composition comprising:
a fluoroelastomer having a Mooney Viscosity (MF 1+10@250° F.) below about 60, selected from the group consisting of copolymers of hexafluoropropylene and vinylidene fluoride and terpolymers of hexafluoropropylene, vinylidene fluoride, and tetrafluoroethylene, and containing at least 40%, by weight, vinylidene fluoride;

up to 25%, by weight, solvent in which the fluoroelastomer is soluble, said solvent being present in an effective amount to make said composition workable;

and an LSA filler in the amount of about 50 to about 350 parts LSA filler per 100 parts of fluoroelastomer, wherein the solids content of the composition is at least about 75%.

35. The composition of claim 34 wherein said LSA filler is in the amount of about 50 to about 300 parts LSA filler per 100 parts of fluoroelastomer.

36. The composition of claim 35 wherein said LSA filler is in the amount of about 150 to about 250 parts LSA filler per 100 parts of fluoroelastomer.

* * * * *

UNITED STATES PATENT AND TRADEMARK OFFICE
CERTIFICATE OF CORRECTION

PATENT NO. : 6,410,630 B1  Page 1 of 1
DATED : June 25, 2002
INVENTOR(S) : Gary S. Hoover and E. William Ross, Jr.

It is certified that error appears in the above-identified patent and that said Letters Patent is hereby corrected as shown below:

<u>Title page,</u>
Item [73], Assignee, change "Newton, PA" to -- Newtown, PA --;

Item [57], ABSTRACT,
Line 2, after "solvent" delete "absorptine" and insert therefor -- absorptive --.

<u>Column 9,</u>
Line 2, delete "Theological" and insert therefor -- Rheological --.

<u>Column 14,</u>
Line 34, before "about 60," insert -- below --.

<u>Column 16,</u>
Lines 59 and 60, delete "(MF 1+10@250º F.)" and insert therefor
-- (ML 1+10@250º F.) --.

<u>Column 18,</u>
Lines 14 and 15, delete "(MF 1+10@250º F.)" and insert therefor
-- (ML 1+10@250º F.) --.

Signed and Sealed this

Fifth Day of November, 2002

Attest:

*Attesting Officer*

JAMES E. ROGAN
*Director of the United States Patent and Trademark Office*